United States Patent
Zhao et al.

(10) Patent No.: US 11,147,019 B2
(45) Date of Patent: Oct. 12, 2021

(54) HYPER SYSTEM FRAME NUMBER DETERMINATION

(71) Applicant: HUAWEI TECHNOLOGIES CO., LTD., Shenzhen (CN)

(72) Inventors: Jing Zhao, Shanghai (CN); Qiang Wang, Shanghai (CN); Haibing Cao, Shanghai (CN); Yinghua Huang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/716,807

(22) Filed: Dec. 17, 2019

(65) Prior Publication Data

US 2020/0128485 A1 Apr. 23, 2020

Related U.S. Application Data (63) Continuation of application No. PCT/CN2017/089014, filed on Jun. 19, 2017.

(51) Int. Cl.
*H04W 52/02* (2009.01)
*H04W 68/02* (2009.01)
*H04W 72/00* (2009.01)

(52) U.S. Cl.
CPC ... *H04W 52/0229* (2013.01); *H04W 52/0216* (2013.01); *H04W 68/02* (2013.01); *H04W 72/005* (2013.01)

(58) Field of Classification Search
CPC ............. H04W 68/02; H04W 52/0216; H04W 52/0229
See application file for complete search history.

(56) References Cited

U.S. PATENT DOCUMENTS 10,455,505 B2 * 10/2019 Bangolae .......... H04W 52/0229
2016/0044578 A1 * 2/2016 Vajapeyam ....... H04W 52/0216
370/252

(Continued)

FOREIGN PATENT DOCUMENTS

CN 104012155 A 8/2014
CN 104737600 A 6/2015

(Continued)

OTHER PUBLICATIONS

3rd Generation Partnership Project; 3GPP TS 36.331 V14.2.2 (Apr. 2017);3rd Generation Partnership Project;Technical Specification Group Radio Access Network;Evolved Universal Terrestrial Radio Access (E-UTRA);Radio Resource Control (RRC);Protocol specification(Release 14); Apr. 1, 2017. total 721 pages.

(Continued)

*Primary Examiner* — Robert C Scheibel
(74) *Attorney, Agent, or Firm* — Rimon PC (57) ABSTRACT

Embodiments of this application provide a hyper system frame number determining method, a communication method and apparatus. The method includes the following steps. First, determining, by an access network device, a first hyper system frame number (HSFN) and a first system frame number SFN, where the first HSFN and the first SFN are determined by the access network device based on a time at which enhanced discontinuous reception (eDRX) is enabled and a preconfigured time. Second, determining, by the access network device, an HSFN adjustment value based on the first SFN and a second SFN, where the second SFN is an SFN used at the time at which the access network device enables the eDRX. Third, adjusting, by the access network device, the first HSFN to a second HSFN based on the HSFN adjustment value, and updating the second HSFN based on the second SFN.

7 Claims, 6 Drawing Sheets

(56) References Cited

U.S. PATENT DOCUMENTS

2017/0339745 A1    11/2017  Uchino et al.
2018/0279256 A1*   9/2018  Wu ..................... H04W 68/005
2019/0313475 A1* 10/2019  Siomina ................ H04W 76/28
2020/0037243 A1*   1/2020  Tamura ............. H04W 52/0216

FOREIGN PATENT DOCUMENTS

| WO | 2016158394 A1 | 10/2016 |
|---|---|---|
| WO | 2016167615 A1 | 10/2016 |
| WO | 2016167616 A1 | 10/2016 |
| WO | 2017052284 A1 | 3/2017 |

OTHER PUBLICATIONS

3rd Generation Partnership Project; 3GPP TS 23.682 V15.1.0 (Jun. 2017), 3rd Generation Partnership Project; Technical Specification Group Services and System Aspects; Architecture enhancements to facilitate communications with packet data networks and applications (Release 15), Jun. 12, 2017. total 117 pages.

Huawei, HiSilicon, Correction of loose Hyper SFN synchronization for eDRX. SA WG2 Meeting #116bis, Aug. 29-Sep. 2, 2016, Sanya, China, S2-164361, 3 pages.

Qualcomm Incorporated, Hyper-SFN paging procedures for eDRX. 3GPP TSG-RAN WG2 Meeting #91bis, Malmo, Sweden, Oct. 5-9, 2015, R2-154846, 4 pages.

\* cited by examiner

HYPER SYSTEM FRAME NUMBER DETERMINATION

CROSS-REFERENCE TO RELATED APPLICATIONS

This application is a continuation of International Patent Application No. PCT/CN2017/089014, filed on Jun. 19, 2017, the disclosure of which is hereby incorporated by reference in its entirety.

TECHNICAL FIELD

This application relates to the field of wireless communications technologies, and in particular, to methods and apparatus for determining hyper system frame numbers.

BACKGROUND

In a long term evolution (LTE) system, a length of each radio frame is usually 10 ms. A base station allocates a system frame number (SFN) for each radio frame in a manner regulated by protocol, and with a SFN value range of 0 to 1023. To reduce power consumption of a terminal in an idle state, enhanced discontinuous reception (eDRX) technologies are introduced to the LTE system. A longer time measurement unit: hyper system frame (HSF) is introduced to eDRX. The number of a hyper frame is referred to as a hyper system frame number (HSFN), which is referred to as a hyper frame number for short below. The duration of a hyper frame includes 1024 radio frames, that is, the duration of a hyper frame is 10.24 s, and the value range of a hyper frame number is 0 to 1023.

When a base station starts an eDRX function, the base station and a mobility management entity (MME) compute an HSFN based on a pre-agreed preconfigured time, and enable the computed HSFN. In addition, the base station computes a first SFN based on the pre-agreed preconfigured time. To maintain synchronization between the base station and an HSFN used by the MME, the HSFN computed by the base station needs to be associated with the first SFN. That is, a second SFN, which is allocated by the base station for a radio frame when the base station starts the eDRX function, replaces the first SFN. However, the foregoing solution may result in hopping of system frame number. Hopping of system frame number may cause many side effects, for example, failure of a collaboration feature between base stations, and a longer cycle in which the base station pages a terminal. In addition, the base station further needs to notify all terminals, by using full paging, that the system frame number is updated.

Therefore, when the base station starts the eDRX function, how to determine a hyper frame number to avoid hopping of the system frame number is a problem that urgently needs to be resolved.

SUMMARY

An objective of implementations of this application is to provide a hyper system frame number determining method, a communication method and apparatus, to implement how a base station determines a hyper frame number when starting an eDRX function, to avoid hopping of system frame number.

A hyper system frame number determining method is provided in an embodiment of this application, including:

determining, by an access network device, a first HSFN and a first SFN, and determining an HSFN adjustment value based on the first SFN and a second SFN, where the second SFN is an SFN used at a time at which the access network device enables the eDRX; and finally adjusting, by the access network device, the first HSFN to obtain a second HSFN based on the HSFN adjustment value and updating the second HSFN based on the second SFN. The first HSFN and the first SFN are determined by the access network device based on a time at which the eDRX is enabled and a preconfigured time.

According to the method provided in this embodiment of this application, the access network device adjusts the first HSFN to obtain the second HSFN based on the HSFN adjustment value, and updates the second HSFN based on the second SFN. Therefore, at the time at which the access network device enables the eDRX, the second SFN may be continuously used, and SFN hopping is not required, so that a network becomes more stable. In addition, enabling the eDRX does not need to depend on a time synchronized network.

Optionally, the determining, by the access network device, an HSFN adjustment value based on the first SFN and a second SFN includes:

determining, by the access network device, the HSFN adjustment value as 0 if an absolute value of a difference between the first SFN and the second SFN is less than or equal to a preset threshold;

determining, by the access network device, the HSFN adjustment value as m if the difference between the first SFN and the second SFN is greater than the preset threshold, where m is an integer greater than 0; or determining, by the access network device, the HSFN adjustment value as n if the difference between the second SFN and the first SFN is greater than the preset threshold, where n is an integer less than 0.

By using the foregoing method, the access network device can accurately determine the HSFN adjustment value based on the difference between the first SFN and the second SFN, and use the HSFN adjustment value to determine the second HSFN accurately.

Optionally, the adjusting, by the access network device, the first HSFN to obtain the second HSFN based on the HSFN adjustment value includes:

determining, by the access network device, the sum of the HSFN adjustment value and the first HSFN as the second HSFN.

Optionally, after the adjusting, by the access network device, the first HSFN to obtain the second HSFN based on the HSFN adjustment value, the method further includes:

broadcasting, by the access network device, the second HSFN by using a broadcast message.

By using the foregoing method, a terminal may also obtain the second HSFN used by the access network device, so that a system becomes more stable.

Optionally, after the adjusting, by the access network device, of the first HSFN to obtain a second HSFN based on the HSFN adjustment value, the method further includes:

sending, by the access network device to a core network device, the second HSFN and a time at which the second HSFN is enabled.

By using the foregoing method, the core network device may also obtain the second HSFN used by the access network device.

A communication method is provided in an embodiment of this application, including:

receiving, by a core network device, a second hyper system frame number (HSFN) and a time at which the second HSFN is enabled that are sent by an access network device, where the second HSFN is determined at a time when the access network device enables enhanced discontinuous reception eDRX; and determining, by the core network device based on the second HSFN and a third HSFN, a time at which a paging message is sent to the access network device, where the third HSFN is determined based on the time at which the access network device enables the eDRX and a preconfigured time.

According to the method provided in this embodiment of this application, the core network device determines, based on the second HSFN and the third HSFN, the time at which the paging message is sent to the access network device. Therefore, the time at which the paging message is sent may be accurately determined, so that the access network device does not need to cache the paging message for a long time, and system efficiency is improved.

Optionally, the determining, by the core network device based on the second HSFN and a third HSFN, of a time at which a paging message is sent to the access network device includes:

determining, by the core network device, a difference between the third HSFN and the second HSFN;

determining, by the core network device, the time at which the paging message is sent as a first time if determining the difference between the third HSFN and the second HSFN as 0, where the first time is a time at which the paging message is sent, and the time at which the paging message is sent is determined by the core network device based on the third HSFN; or if determining the difference between the third HSFN and the second HSFN as p, and p is a positive integer greater than 0, advancing, by the core network device, the first time at which the paging message is sent p hyper frames; or if determining the difference between the third HSFN and the second HSFN as q, and q is an integer less than 0, delaying, by the core network device, the first time at which the paging message is sent by |q| hyper system frames, where |q| is an absolute value of q.

An access network device is provided in an embodiment of this application, including:

a first determining unit, configured to determine a first hyper system frame number (HSFN) and a first system frame number (SFN), where the first HSFN and the first SFN are determined by the access network device based on a time at which eDRX is enabled and a preconfigured time; and a second determining unit, configured to determine an HSFN adjustment value based on the first SFN and a second SFN, where the second SFN is an SFN used at the time at which the access network device enables the eDRX; and adjust the first HSFN to a second HSFN based on the HSFN adjustment value and update the second HSFN based on the second SFN.

Optionally, the second determining unit is specifically configured to:

determine the HSFN adjustment value as 0 if the absolute value of a difference between the first SFN and the second SFN is determined to be less than or equal to a preset threshold;

determine the HSFN adjustment value as m if the difference between the first SFN and the second SFN is determined to be greater than the preset threshold, where m is an integer greater than 0; or determine the HSFN adjustment value as n if the difference between the second SFN and the first SFN is determined to be greater than the preset threshold, where n is an integer less than 0.

Optionally, the second determining unit is specifically configured to: determine a sum of the HSFN adjustment value and the first HSFN as the second HSFN.

Optionally, the access network device further includes a transceiver unit, and the transceiver unit is configured to:

broadcast the second HSFN by using a broadcast message.

Optionally, the access network device further includes the transceiver unit, and the transceiver unit is configured to:

send the second HSFN and a time at which the second HSFN is enabled to a core network device.

A core network device is provided in an embodiment of this application, including:

a transceiver unit, configured to receive a second hyper system frame number HSFN and a time at which the second HSFN is enabled that are sent by an access network device, where the second HSFN is determined at a time when the access network device enables eDRX; and a processing unit, configured to determine, based on the second HSFN and a third HSFN, a time at which a paging message is sent to the access network device, where the third HSFN is determined based on the time at which the access network device enables the eDRX and a preconfigured time.

Optionally, the processing unit is specifically configured to:

determine a difference between the third HSFN and the second HSFN;

determine the time at which the paging message is sent as a first time if the difference between the third HSFN and the second HSFN is determined as 0, where the first time is the time at which the paging message is sent, and the time at which the paging message is sent is determined by the core network device based on the third HSFN;

if the difference between the third HSFN and the second HSFN is determined as p, and p is a positive integer greater than 0, advance the first time at which the paging message is sent p hyper frames; or if the difference between the third HSFN and the second HSFN is determined as q, and q is an integer less than 0, delay the first time at which the paging message is sent by |q| hyper frames, where |q| is the absolute value of q.

An access network device is provided in an embodiment of this application, including a processor, a transceiver, and a memory, where the memory is configured to store a computer instruction; and the processor is configured to read the computer instruction stored in the memory, to perform following operations:

determining a first hyper system frame number (HSFN) and a first system frame number (SFN), where the first HSFN and the first SFN are determined by the access network device based on a time at which eDRX is enabled and a preconfigured time; and determining an HSFN adjustment value based on the first SFN and a second SFN, where the second SFN is an SFN used at the time at which the access network device enables the eDRX; and adjusting the first HSFN to a second HSFN based on the HSFN adjustment value, and updating the second HSFN based on the second SFN.

Optionally, the processor is specifically configured to:

determine the HSFN adjustment value as 0 if the absolute value of a difference between the first SFN and the second SFN is determined to be less than or equal to a preset threshold determine the HSFN adjustment value as m if the difference between the first SFN and the second SFN is determined to be greater than the preset threshold, where m is an integer greater than 0; or determine the HSFN adjustment value as n if the difference between the second SFN and the first SFN is determined to be greater than the preset threshold, where n is an integer less than 0.

Optionally, the processor is specifically configured to:
determine a sum of the HSFN adjustment value and the first HSFN as the second HSFN.

Optionally, the transceiver is configured to:
broadcast the second HSFN by using a broadcast message.

Optionally, the transceiver is configured to:
send the second HSFN and a time at which the second HSFN is enabled to a core network device.

A core network device is provided in an embodiment of this application, including:

a transceiver, configured to receive a second hyper system frame number (HSFN) and a time at which the second HSFN is enabled that are sent by an access network device, where the second HSFN is determined at a time when the access network device enables eDRX; and a processor, configured to determine, based on the second HSFN and a third HSFN, a time at which a paging message is sent to the access network device, where the third HSFN is determined based on the time at which the access network device enables the eDRX and a preconfigured time.

Optionally, the processor is specifically configured to:
determine a difference between the third HSFN and the second HSFN;

determine the time at which the paging message is sent as a first time if the difference between the third HSFN and the second HSFN is determined as 0, where the first time is the time at which the paging message is sent, and the time at which the paging message is sent is determined by the core network device based on the third HSFN; or if the difference between the third HSFN and the second HSFN is determined as p, and p is a positive integer greater than 0, advance the first time at which the paging message is sent p hyper frames; or if the difference between the third HSFN and the second HSFN is determined as q, and q is an integer less than 0, delay the first time at which the paging message is sent by |q| hyper frames, where |q| is the absolute value of q.

An embodiment of this application further provides a computer storage medium. The storage medium stores a software program. When read and executed by one or more processors, the software program implements the method according to any one of the foregoing designs.

An embodiment of this application further provides a communications system, and the system includes the access network device or the core network device according to any one of the foregoing designs. Optionally, the system may further include another device that implements the solution provided in the embodiments of this application and that interacts with the access network device or the core network device.

An embodiment of this application further provides a computer program product including an instruction. When executing on a computer, the computer is enabled to perform the method according to the foregoing aspects.

DESCRIPTION OF EMBODIMENTS

The following further describes the embodiments of this application in detail with reference to accompanying drawings.

The terms used in the embodiments of this application are merely for the purpose of illustrating specific embodiments, and are not intended to limit this application. It should also be understood that, the term "and/or" used herein indicates and includes any or all possible combinations of one or more associated listed items. In addition, the character "/" in this specification generally indicates an "or" relationship between the associated objects. In the embodiments of this application, "a first time", "a first HSFN", "a first SFN", and the like are merely used to differentiate different times, HSFNs, SFNs, and the like, and are not intended for any other limitation.

The embodiments of this application may be applicable to various communications systems, for example, a global system for mobile communications (GSM), a code division multiple access (CDMA) system, a wideband code division multiple access (WCDMA) system, a general packet radio service (GPRS), a long term evolution (LTE) system, an advanced long term evolution (LTE-A) system, a universal mobile telecommunication system (UMTS), an evolved long term evolution (eLTE) system, a 5G (for example, a new radio (NR) system), and another mobile communications system.

In addition, it should be noted that in the embodiments of this application, a terminal, also referred to as user equipment (terminal), is a device that provides a user with voice and/or data connectivity, for example, a handheld device with a radio connection function, or a vehicle-mounted device. A common terminal includes, for example, a mobile phone, a tablet, a notebook computer, a palmtop computer, a mobile internet device (MID), and a wearable device such as a smartwatch, a smart band, or a pedometer.

In the embodiments of this application, an access network device may be a common base station (for example, a Node B, or an eNB), a new radio controller (NR controller), a gNode B (gNB) in a 5G system, a centralized unit (Centralized Unit), a new radio base station, a radio remote module, a micro base station, a relay (relay), a distributed unit (Distributed Unit), a transmission reception point (TRP) or a transmission point (TP) or any other radio access devices. However, the embodiments of this application are not limited thereto.

Figure 1:
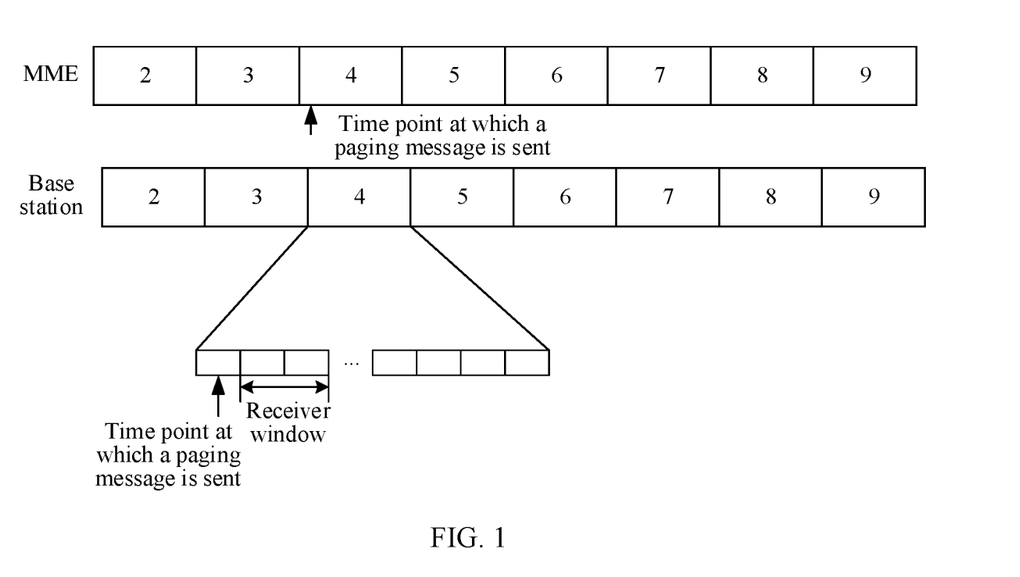
FIG. 1 is a schematic diagram of paging time alignment in the prior art.

The 3rd Generation Partnership Project (3GPP) prolongs a paging cycle by introducing an eDRX function, to reduce power consumption of a terminal in an idle state. Before the eDRX is introduced, a maximum paging cycle of LTE is 256 radio frames, that is, 2.56 s. After the eDRX is introduced, a maximum of the paging cycle may be 256 hyper frames, that is, 43.69 minutes. FIG. 1 is a schematic diagram of paging time alignment in the prior art. With reference to FIG. 1, when an MME needs to page a terminal, a time point at which the MME sends a paging message may be as shown in FIG. 1. The MME sends, slightly in advance, a paging message that includes a hyper frame number and a receiver window in which the terminal receives the paging message to the base station. A time point at which the terminal receives the paging message is located in a time period of the receiver window in FIG. 1. If the MME and an HSFN of the base station are aligned strictly, the MME can deliver the paging message according to a correct HSFN in which the terminal receives the paging, and a time at which the paging message arrives at the base station is slightly ahead of the time period in which the terminal receives the paging message. In this way, the time period in which the base station caches the paging message is not excessively long. Otherwise, the time period required by the base station to cache the paging message is the maximum paging cycle, 43.69 minutes. Consequently, an excessively long delay occurs in the service of the terminal, and requirements for the memory of the base station are high.

Figure 2:
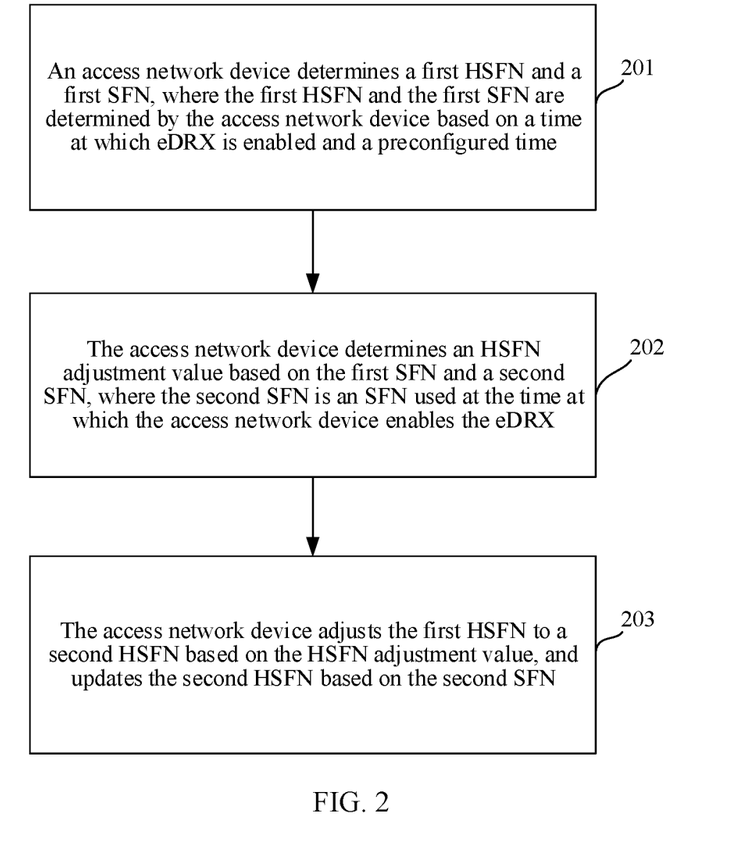
FIG. 2 is a schematic flowchart of a hyper system frame number determining method according to an embodiment of this application.

With reference to the foregoing description, FIG. 2 is a schematic flowchart of a hyper system frame number determining method according to an embodiment of this application.

Referring to FIG. 2, the method includes the following steps.

Step 201. An access network device determines a first HSFN and a first SFN, where the first HSFN and the first SFN are determined by the access network device based on a time at which the eDRX is enabled and a preconfigured time.

Step 202. The access network device determines an HSFN adjustment value based on the first SFN and a second SFN, where the second SFN is an SFN used at the time at which the access network device enables the eDRX.

Step 203. The access network device adjusts the first HSFN to obtain a second HSFN based on the HSFN adjustment value, and updates the second HSFN based on the second SFN.

In step 201, the access network device and a core network device (for example, an MME) pre-agree a preconfigured time (preconfigured time) as the time at which the HSFN counts from 0. When the access network device enables the eDRX, the access network device and the MME compute the HSFN separately and independently. In addition, the access network device may also use the preconfigured time as a starting time at which the first SFN is computed, and a value of the first SFN at the preconfigured time is 0.

For example, the preconfigured time is 1:0:0 on Jan. 1, 2010, and the time at which the access network device enables the eDRX is 3:50:40 on Jan. 1, 2010, that is, 10240 s passes before the time at which the access network device enables the eDRX relative to the pre-agreed preconfigured time. Therefore, the access network device and the core network device compute that the first HSFN of the time at which the eDRX is enabled should be 1000, and the access network device computes that the first SFN of the time at which the eDRX is enabled should be 0.

In theory, results computed by the access network device and the core network device are the same. However, differences may exist, but they are not large, so that the results are not affected.

It should be noted that the access network device may notify the core network device the time at which the eDRX is enabled in advance, or may notify the core network device the time at which the eDRX is enabled in another manner. This is not described herein again.

In step 202, the access network device allocates a system frame number for each radio frame in a manner regulated by protocol. In this embodiment of this application, at the time when the access network device enables the eDRX, the system frame number allocated by the access network device for the radio frame is referred to as a second HSFN.

The access network device may determine the HSFN adjustment value by using the following manners.

Manner 1: The access network device determines the HSFN adjustment value as 0 if an absolute value of the difference between the first SFN and the second SFN is determined to be less than or equal to a preset threshold.

Manner 2: The access network device determines the HSFN adjustment value as m if the difference between the first SFN and the second SFN is determined to be greater than the preset threshold, where m is an integer greater than 0. For example, m may be equal to 1.

Manner 3: The access network device determines the HSFN adjustment value as n if the difference between the second SFN and the first SFN is determined to be greater than the preset threshold, where n is an integer less than 0. For example, n may be equal to −1.

It should be noted that in this embodiment of this application, the preset threshold may be a positive integer greater than or equal to 0, and less than 1024.

For example, the preset threshold is 512, and the access network device determines that the first SFN is 0, and the first HSFN is 1000. If the second SFN allocated by the access network device for the radio frame at the time when the eDRX is enabled is 100, and an absolute value of the difference between the first SFN and the second SFN is less than 512, it may be determined that the HSFN adjustment value is 0. Correspondingly, if the second HSFN allocated by the access network device for the radio frame at the time at which the eDRX is enabled is 612, and a difference between the second SFN and the first SFN is greater than 512, it may be determined that the HSFN adjustment value is n. Certainly, the foregoing description is just an example. There may be other cases, which are not described as examples one by one herein again.

In step 203, the access network device may determine a sum of the HSFN adjustment value and the first HSFN as the second HSFN, and use the second HSFN as a hyper frame number enabled at the time at which the eDRX is enabled.

For example, the first HSFN is 1000, the HSFN adjustment value is −1, and in this case, the second HSFN is 999=1000+(−1).

It should be noted that in this embodiment of this application, at a time at which the second HSFN is enabled, regardless of whether the first SFN and the second SFN that are computed by the access network device are the same, SFN hopping is not required, and continuity of the current allocated second SFN is maintained. In addition, the access network device updates the second HSFN based on the second SFN. That is, when the second SFN is 1023, 1 is added to the second HSFN. When the value of the second HSFN reaches 1023, the second HSFN starts from 0 again as a cycle.

In the foregoing solution, although the first HSFN is adjusted to obtain the second HSFN, in a case that the core network device does not adjust a third HSFN computed by the core network device, the second HSFN used by the access network device and the third HSFN used by the core network device can maintain approximate synchronization, without affecting usage of the system.

For example, the preset threshold is 512, and the access network device determines that the first SFN is 0, and the first HSFN is 1000. If the second SFN allocated by the access network device for the radio frame at the time at which the eDRX is enabled is 100, in this case, the HSFN adjustment value is 0, and the obtained second HSFN is 1000. The third HSFN used by the core network device differs from the second HSFN used by the access network device by a duration length of 100 radio frames, that is, 1 s.

For another example, the preset threshold is 512, n is −1, and the access network device determines that the first SFN is 0, and the first HSFN is 1000. If the second SFN allocated by the access network device for the radio frame at the time at which the eDRX is enabled is 824, in this case, the HSFN adjustment value is −1, and the obtained second HSFN is 999. The third HSFN used by the core network device differs from the second HSFN used by the access network device by a duration length of 200 radio frames, that is, 2 s.

For another example, the preset threshold is 512, m is 1, and access network device determines that the first SFN is 824, and the first HSFN is 1000. If the second SFN allocated by the access network device for the radio frame at the time at which the eDRX is enabled is 0, in this case, the HSFN adjustment value is 1, and the obtained second HSFN is 1001. The third HSFN used by the core network device differs from the second HSFN used by the access network device by a duration length of 200 radio frames, that is, 2 s.

Optionally, after adjusting the first HSFN to obtain the second HSFN based on the HSFN adjustment value, the access network device may further broadcast the second HSFN by using a broadcast message, so that terminals within a coverage range of signal of the access network device determine a hyper frame number currently used by the access network device.

In this embodiment of this application, the access network device may further send the second HSFN and a time at which the second HSFN is enabled to the core network device (for example, the MME).

Figure 3:
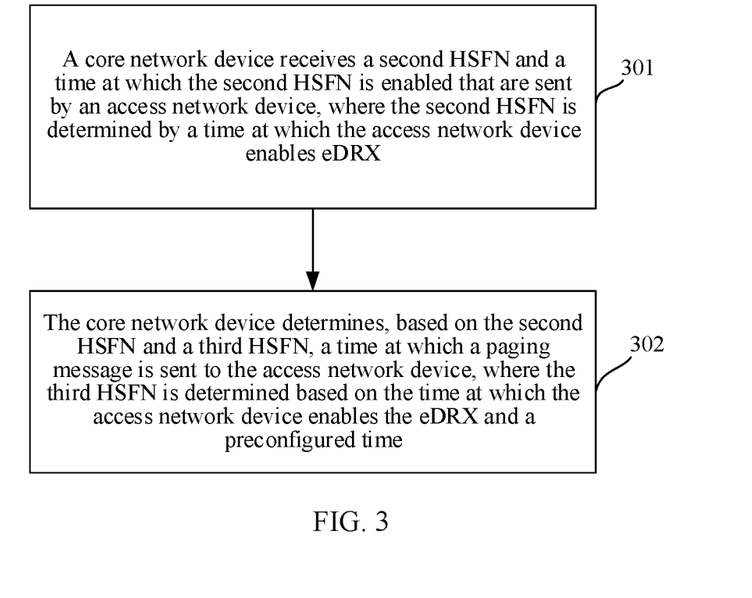
FIG. 3 is a schematic flowchart of a communication method according to an embodiment of this application.

Specifically, FIG. 3 is a schematic flowchart of a communication method according to an embodiment of this application.

Referring to FIG. 3, the method includes the following steps.

Step 301: A core network device receives a second HSFN and a time at which the second HSFN is enabled, e.g., being used, that are sent by an access network device, where the second HSFN is determined at a time at which the access network device enables eDRX.

Step 302: The core network device determines a time at which a paging message is sent to the access network device based on the second HSFN and a third HSFN, where the third HSFN is determined based on the time at which the access network device enables the eDRX and a preconfigured time.

After receiving the second HSFN and the time at which the second HSFN is enabled that are sent by the access network device, the core network device may adjust the third HSFN determined by the core network device to obtain the second HSFN, and enable the second HSFN at the time when the access network device can enable the second HSFN. Certainly, the core network device may also skip adjusting the computed third HSFN. It should be noted that a preconfigured time used by the core network device to determine the third HSFN is agreed by the access network device.

Currently, when a network side pages a terminal, a paging message is generally first sent by the core network device to the access network device. The paging message includes a hyper frame number and a receiver window in which the terminal receives the paging message. The access network device then transmits the paging message to the terminal. The core network device sends the paging message to the access network device before the hyper frame number in which the terminal receives the paging message arrives. In this way, the terminal can receive the paging message in a corresponding hyper frame.

With reference to the foregoing description, optionally, in this embodiment of this application, the core network device may further determine, based on the second HSFN and a third HSFN, the time at which the paging message is sent to the access network device.

Specifically, the core network device determines a difference between the third HSFN and the second HSFN.

The core network device determines the time at which the paging message is sent as a first time if the difference between the third HSFN and the second HSFN is determined as 0, where the first time is the time at which the paging message is sent, and the time at which the paging message is sent is determined by the core network device based on the third HSFN. How to specifically determine the time is in the prior art, and is not described herein again.

If the difference between the third HSFN and the second HSFN is determined as p, and p is a positive integer greater than 0, the core network device advances the first time at which the paging message is sent p hyper frames.

If the difference between the third HSFN and the second HSFN is determined as q, and q is an integer less than 0, the core network device delays the first time at which the paging message is sent by |q| hyper frames, where |q| is an absolute value of q.

Figure 4:
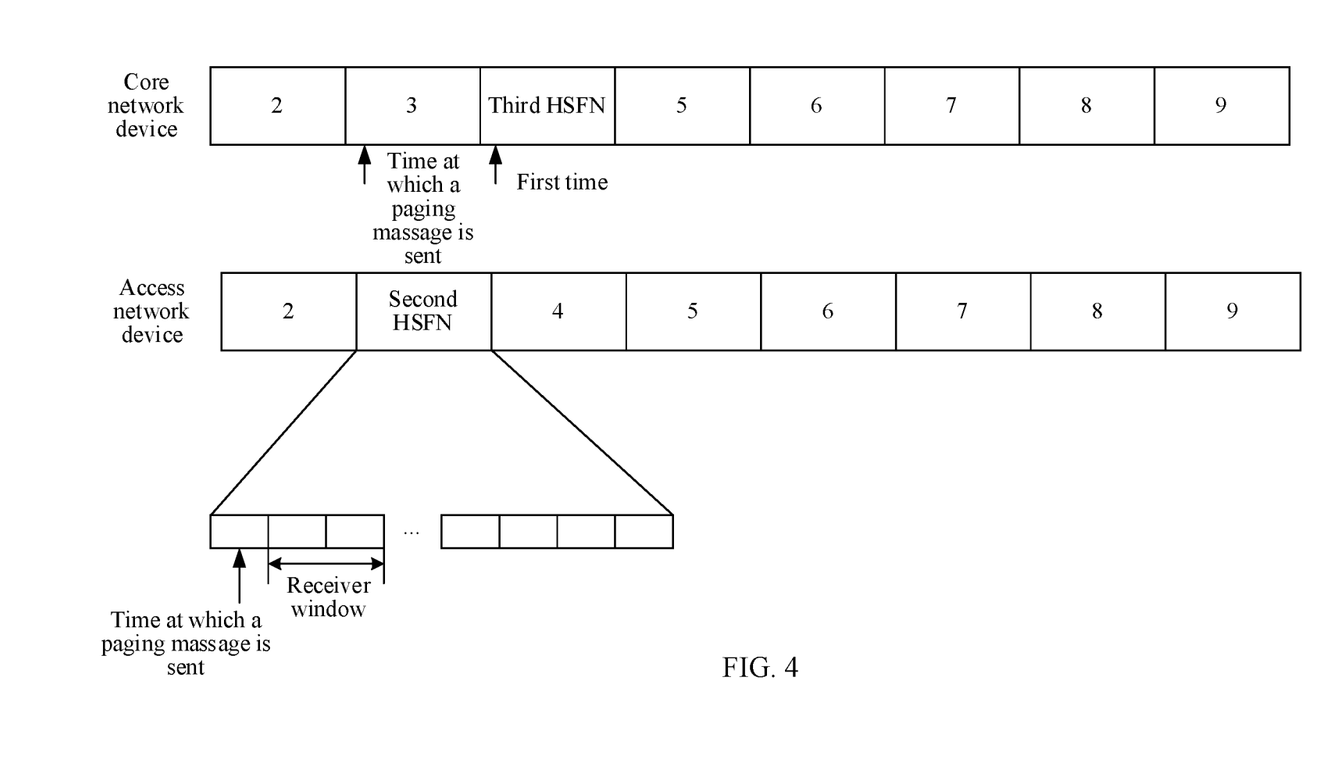
FIG. 4 is a schematic diagram of paging time alignment according to an embodiment of this application.

For example, FIG. 4 is a schematic diagram of paging time alignment according to an embodiment of this application. With reference to FIG. 2, when the core network device needs to page the terminal, the time at which the paging message is sent determined by the core network device based on the third HSFN is the first time. Details may be as shown in FIG. 4.

The core network device receives the second HSFN sent by the access network device, and advances the first time at which the paging message is sent 1 hyper frame if the difference between the third HSFN and the second HSFN is determined as 1.

Compared with the first time, the core network device, 1 hyper system frame in advance, sends the paging message that includes the hyper frame number and the receiver window in which the terminal receives the paging message to an access network device station. In this way, the access network device may send the paging message to the terminal as soon as possible, and in this case, a time point at which the terminal receives the paging message is located in a time period of the receiver window in FIG. 4.

Finally, the core network device may send the paging message to the access network device at a determined time at which the paging message is sent. Specific processes are not described herein again, and may refer to description in the prior art.

Based on a same technical concept, an embodiment of this application further provides an access network device, and the access network device may perform the foregoing method embodiment.

Figure 5:
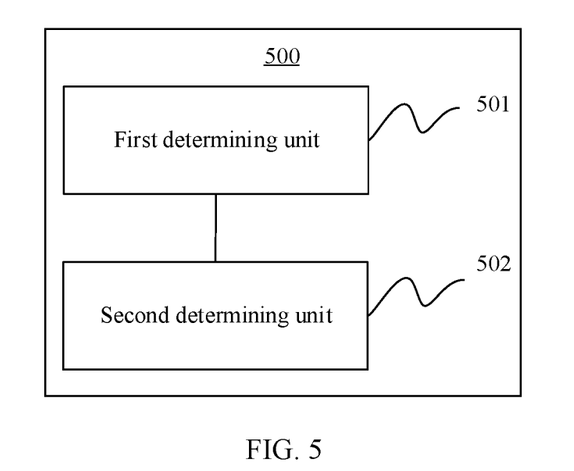
FIG. 5 is a schematic structural diagram of an access network device according to an embodiment of this application.

FIG. 5 is a schematic structural diagram of an access network device according to an embodiment of this application. The access network device 500 includes:

a first determining unit 501, configured to determine a first hyper system frame number (HSFN) and a first system frame number (SFN), where the first HSFN and the first SFN are determined by the access network device based on a time at which eDRX is enabled and a preconfigured time; and a second determining unit 502, configured to determine an HSFN adjustment value based on the first SFN and a second SFN, where the second SFN is an SFN used at the time at which the access network device enables the eDRX; and adjust the first HSFN to obtain a second HSFN based on the HSFN adjustment value and update the second HSFN based on the second SFN.

Other content that may be performed by the access network device 500 may refer to the description from step 201 to step 203, and details are not described herein again.

Figure 6:
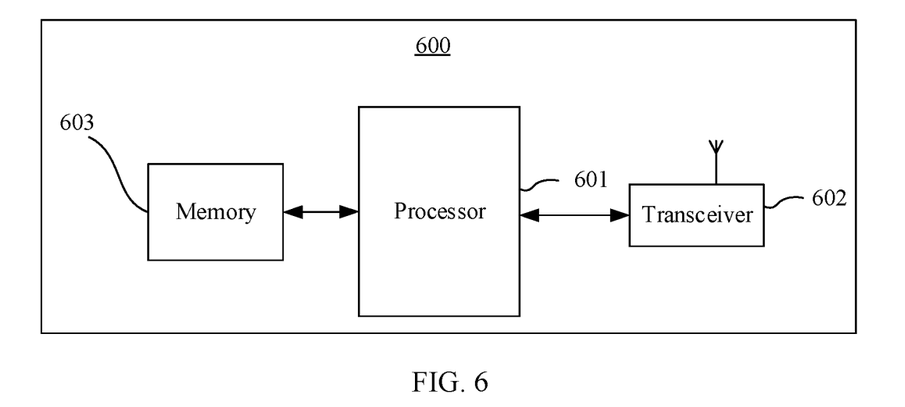
FIG. 6 is a schematic structural diagram of an access network device according to an embodiment of this application.

FIG. 6 is a schematic structural diagram of an access network device according to an embodiment of this application. The access network device 600 includes a processor 601, a transceiver 602, and a memory 603.

The memory 603 is configured to store a computer instruction.

The processor 601 is configured to read the computer instruction stored in the memory 603, to perform following operations:

determining a first hyper system frame number (HSFN) and a first system frame number (SFN), where the first HSFN and the first SFN are determined by the access network device based on a time at which eDRX is enabled and a preconfigured time; and determining an HSFN adjustment value based on the first SFN and a second SFN, where the second SFN is an SFN used at the time at which the access network device enables the eDRX; and adjusting the first HSFN to a second HSFN based on the HSFN adjustment value, and updating the second HSFN based on the second SFN.

Optionally, the transceiver 602 is configured to:

broadcast the second HSFN by using a broadcast message.

Optionally, the transceiver 602 is configured to:

send the second HSFN and a time at which the second HSFN is enabled to a core network device.

Other content that may be performed by the access network device 600 may refer to the description from step 201 to step 203, and details are not described herein again.

Based on a same technical concept, an embodiment of this application further provides a core network device, and the core network device may perform the foregoing method embodiment.

Figure 7:
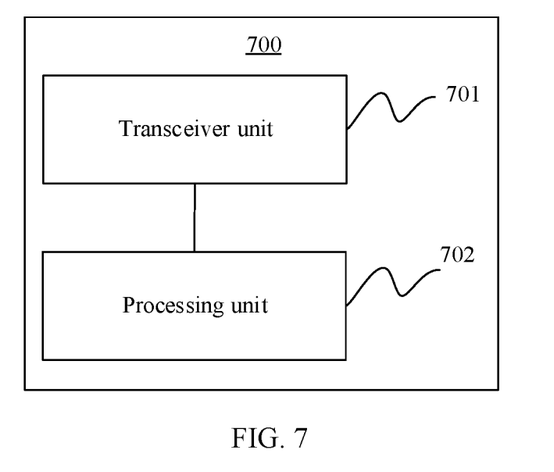
FIG. 7 is a schematic structural diagram of an access network device according to an embodiment of this application.

FIG. 7 is a schematic structural diagram of a core network device according to an embodiment of this application. The core network device 700 includes:

a transceiver unit 701, configured to receive a second hyper system frame number (HSFN) and a time at which the second HSFN is enabled that are sent by an access network device, where the second HSFN is determined at a time when the access network device enables enhanced discontinuous reception eDRX; and a processing unit 702, configured to determine, based on the second HSFN and a third HSFN, a time at which a paging message is sent to the access network device, where the third HSFN is determined based on the time at which the access network device enables the eDRX and a preconfigured time.

Optionally, the processing unit 702 is specifically configured to:

determine a difference between the third HSFN and the second HSFN;

determine the time at which the paging message is sent as a first time if the difference between the third HSFN and the second HSFN is determined as 0, where the first time is the time at which the paging message is sent, and the time at which the paging message is sent is determined by the core network device based on the third HSFN;

if the difference between the third HSFN and the second HSFN is determined as p, and p is a positive integer greater than 0, advance the first time at which the paging message is sent p hyper frames; or if the difference between the third HSFN and the second HSFN is determined as q, and q is an integer less than 0, delay the first time at which the paging message is sent by |q| hyper frames, t, where |q| is an absolute value of q.

Figure 8:
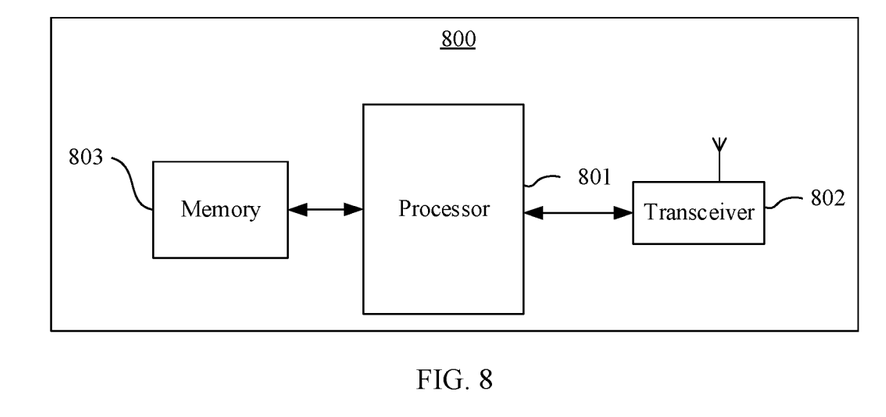
FIG. 8 is a schematic structural diagram of an access network device according to an embodiment of this application.

FIG. 8 is a schematic structural diagram of a core network device according to an embodiment of this application. The core network device 800 includes:

a memory 803, configured to store a computer instruction;

a transceiver 802, configured to receive a second hyper system frame number (HSFN) and a time at which the second HSFN is enabled that are sent by an access network device, where the second HSFN is determined at a time when the access network device enables eDRX; and a processor 801, configured to read the computer instruction stored in the memory 603, to perform following operations:

determining, based on the second HSFN and a third HSFN, a time at which a paging message is sent to the access network device, where the third HSFN is determined based on the time at which the access network device enables the eDRX and a preconfigured time.

Optionally, the processor 801 is specifically configured to:

determine a difference between the third HSFN and the second HSFN;

determine the time at which the paging message is sent as a first time if the difference between the third HSFN and the second HSFN is determined as 0, where the first time is the time at which the paging message is sent, and the time at which the paging message is sent is determined by the core network device based on the third HSFN; or if the difference between the third HSFN and the second HSFN is determined as p, and p is a positive integer greater than 0, advance the first time at which the paging message is sent p hyper frames; or if the difference between the third HSFN and the second HSFN is determined as q, and q is an integer less than 0, delay the first time at which the paging message is sent by |q| hyper frames where |q| is an absolute value of q.

Cross reference may be performed between related parts between the method embodiments of this application; and apparatuses provided in the apparatus embodiments are configured to perform the methods provided in corresponding method embodiments. Therefore, the apparatus embodiments may be understood with reference to related parts in the related method embodiments.

A person of ordinary skill in the art may understand that all or some of the steps in the methods of the foregoing embodiments may be implemented by a program instructing relevant hardware. The program may be stored in a readable storage medium of a device. When the program is executed, the storage medium, for example, a disk memory or an optical memory, of the foregoing all or some of the steps is included.

In the foregoing specific implementations, the objective, technical solutions, and beneficial effects of this application are further described in detail. It should be understood that different embodiments can be combined. The foregoing descriptions are merely specific implementations of this application, but are not intended to limit the protection scope of this application. Any combination, modification, equivalent replacement, or improvement made without departing from the spirit and principle of this application should fall within the protection scope of this application.

What is claimed is:

1. A hyper system frame number determining method that avoids SFN hopping, the method comprising:
   determining, by an access network device, a first hyper system frame number (HSFN) and a first system frame number (SFN), wherein the first HSFN and the first SFN are determined by the access network device based on a time at which enhanced discontinuous reception (eDRX) is enabled and a preconfigured time at which the HSFN counts from 0, wherein the HSFN is computed by the access network device and a core network device independently;
   determining, by the access network device, an HSFN adjustment value based on the first SFN and a second SFN, wherein the second SFN is an SFN used at the time at which the access network device enables the eDRX by
      determining the HSFN adjustment value as 0 if determining that an absolute value of a difference between the first SFN and the second SFN is less than or equal to a preset threshold;
      determining the HSFN adjustment value as m if determining that the difference between the first SFN and the second SFN is greater than the preset threshold, wherein m is an integer greater than 0; or
      determining the HSFN adjustment value as n if determining that the difference between the second SFN and the first SFN is greater than the preset threshold, wherein n is an integer less than 0; and
   adjusting, by the access network device, the first HSFN to obtain a second HSFN based on the HSFN adjustment value, the adjusting performed by determining a sum of the HSFN adjustment value and the first HSFN as the second HSFN, and updating the second HSFN based on the second SFN, wherein when the second SFN is 1023, 1 is added to the second HSFN, and when the value of the second HSFN reaches 1023, the second HSFN starts from 0 again and wherein the second SFN is continuously used, and SFN hopping is not required.

2. The method according to claim 1, wherein after the adjusting, by the access network device, of the first HSFN to obtain a second HSFN based on the HSFN adjustment value, the method further comprises:
   broadcasting, by the access network device, the second HSFN by using a broadcast message.

3. The method according to claim 1, wherein after the adjusting, by the access network device, of the first HSFN to obtain a second HSFN based on the HSFN adjustment value, the method further comprises:
   sending, by the access network device to a core network device, the second HSFN and a time at which the second HSFN is enabled.

4. A communication method that avoids SFN hopping, the method comprising:
   receiving, by a core network device, a second hyper system frame number (HSFN) and a time at which the second HSFN is enabled that are sent by an access network device, where the second HSFN is determined at a time when the access network device enables enhanced discontinuous reception (eDRX); and
   determining, by the core network device based on the second HSFN and a third HSFN, a time at which a paging message is sent to the access network device, where the third HSFN is determined based on the time at which the access network device enables the eDRX and a preconfigured time, wherein the determining, by the core network device based on the second HSFN and a third HSFN, of the time at which the paging message is sent to the access network device comprises
   determining a difference between the third HSFN and the second HSFN;
   determining the time at which the paging message is sent as a first time if the difference between the third HSFN and the second HSFN is 0, wherein the first time is a time at which the paging message is sent, and the time at which the paging message is sent is determined by the core network device based on the third HSFN; or
   if the difference between the third HSFN and the second HSFN is p, and p is a positive integer greater than 0, advancing, by the core network device, the first time at which the paging message is sent by p hyper frames; or
   if the difference between the third HSFN and the second HSFN is q, and q is an integer less than 0, delaying, by the core network device, the first time at which the paging message is sent by |q| hyper frames, wherein |q| is an absolute value of q and wherein a second SFN is continuously used, and SFN hopping is not required.

5. An access network device that avoids SFN hopping, the method comprising:
   a first determining unit, configured to determine a first hyper system frame number (HSFN) and a first system frame number (SFN), wherein the first HSFN and the first SFN are determined by the access network device based on a time at which enhanced discontinuous reception (eDRX) is enabled and a preconfigured time at which the HSFN counts from 0, wherein the HSFN is computed by the access network device and a core network device independently; and
   a second determining unit, configured to determine an HSFN adjustment value based on the first SFN and a second SFN, wherein the second SFN is an SFN used at the time at which the access network device enables the eDRX by
   determining the HSFN adjustment value as 0 if determining that an absolute value of a difference between the first SFN and the second SFN is less than or equal to a preset threshold;
   determining the HSFN adjustment value as m if determining that the difference between the first SFN and the second SFN is greater than the preset threshold, wherein m is an integer greater than 0; or
   determining the HSFN adjustment value as n if determining that the difference between the second SFN and the first SFN is greater than the preset threshold, wherein n is an integer less than 0;

and adjust the first HSFN to obtain a second HSFN based on the HSFN adjustment value, the adjusting performed by determining a sum of the HSFN adjustment value and the first HSFN as the second HSFN, and update the second HSFN based on the second SFN, wherein when the second SFN is 1023, 1 is added to the second HSFN, and when the value of the second HSFN reaches 1023, the second HSFN starts from 0 again, and wherein the second SFN is continuously used, and SFN hopping is not required.

6. The access network device according to claim 5, wherein the access network device further comprises a transceiver unit, and the transceiver unit is configured to:
broadcast the second HSFN by using a broadcast message.

7. The access network device according to claim 5, wherein the access network device further comprises the transceiver unit, and the transceiver unit is configured to:
send the second HSFN and a time at which the second HSFN is enabled to a core network device.

\* \* \* \* \*